UNITED STATES PATENT OFFICE.

MARTIN HERZBERG AND FRIEDRICH RUNKEL, OF ELBERFELD, GERMANY, ASSIGNORS TO FARBENFABRIKEN VORM. FRIEDR. BAYER & CO., OF ELBERFELD, GERMANY, A CORPORATION OF GERMANY.

AZO DYE.

953,034.  Specification of Letters Patent.  Patented Mar. 29, 1910.

No Drawing.  Application filed August 14, 1909.  Serial No. 512,890.

*To all whom it may concern:*

Be it known that we, MARTIN HERZBERG and FRIEDRICH RUNKEL, doctors of philosophy, chemists, citizens of the German Empire, residing at Elberfeld, Germany, have invented new and useful Improvements in Azo Dyes, of which the following is a specification:

Our invention relates to the manufacture and production of new azo dyes which can be obtained by combining in alkaline solution the diazo compounds of aminophenylethers or their derivatives with a substituted 2-amino-8-naphthol-6-sulfonic acid containing in the amino group an aryl or an aralkyl, such as phenyl, tolyl, benzyl etc. of the formula:

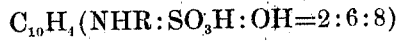

$C_{10}H_4(NHR:SO_3H:OH=2:6:8)$

R standing for an aryl or aralkyl radical.

The new dyestuffs are after being dried and pulverized in the shape of their sodium salts dark powders soluble in water with a brown to brownish-red color. Upon reduction with stannous chlorid and hydrochloric acid, they are decomposed, an aminophenylether and a diaminonaphthol sulfonic acid of the formula:

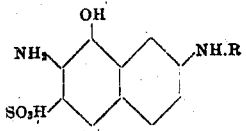

(R meaning aryl or aralkyl) being thus obtained.

The new coloring matters dye wool from acid baths brown shades remarkable for their fastness to milling and to washing.

In order to carry out our process we can e. g. proceed as follows, the parts being by weight: 22 parts of para-amino-para¹-chloro-phenylether are dissolved in 250 parts of hot water with the addition of 14 parts of crude hydrochloric acid. After cooling 16 parts of crude hydrochloric acid are added and the mixture is diazotized in the usual way. The diazo compound is introduced into a cold aqueous solution of 33 parts of 2-benzylamino-8-naphthol-6-sulfonic acid containing an excess of sodium carbonate. The dyestuff is salted out, filtered off, washed and dried. It is after being dried and pulverized in the shape of its sodium salt a reddish-brown powder soluble in water with a reddish-brown color and soluble in concentrated sulfuric acid with a violet color. Upon reduction with stannous chlorid and hydrochloric acid the new dye is decomposed, para-amino-para¹-chlorophenylether and 7-amino-2-benzylamino-8-naphthol-6-sulfonic acid being thus obtained.

The new dyestuff dyes wool reddish-brown shades fast to washing and to milling.

The process is carried out in an analogous manner for the production of other of the above mentioned dyestuffs e. g. from 2-phenylamino-8-naphthol-6-sulfonic acid, 2-tolylamino-8-naphthol-6-sulfonic acid etc. and other aminophenylethers, e. g. para- or ortho-aminophenylether, ortho-amino-para¹-chloro-phenylether, ortho-amino-para-chloro-phenyl-para¹-tolylether, ortho-aminophenyl-ortho¹-meta¹- or para¹-tolylether, para-amino-phenyl-ortho¹-meta¹- or para¹-tolylether etc.

We claim:—

1. The herein described new azo dyestuffs obtainable from a diazotized aminophenylether and a substituted 2-amino-8-naphthol-6-sulfonic acid of the above given formula, which are after being dried and pulverized in the shape of their sodium salts dark powders soluble in water with a brown to reddish-brown color; yielding upon reduction with stannous chlorid and hydrochloric acid an aminophenylether and a diaminonaphthol sulfonic acid of the above given formula; and dyeing wool from acid baths brown shades remarkable for their fastness to washing and to milling, substantially as described.

2. The herein described new azodyestuff obtainable from diazotized para-amino-para¹-chloro-phenylether and 2-benzylamino-8-naphthol-6-sulfonic acid, which dye is after being dried and pulverized in the shape of its sodium salt a reddish-brown powder soluble in water with a reddish-brown color and soluble in concentrated sulfuric acid with a violet color; yielding upon reduction with stannous chlorid and hydrochloric acid para-amino-para¹-chlorophenylether and 7-amino-2-benzylamino-8-naphthol-6-sulfonic acid; and dyeing wool reddish-brown shades remarkable for their fastness to washing and to milling, substantially as described.

In testimony whereof we have hereunto set our hands in the presence of two subscribing witnesses.

MARTIN HERZBERG. [L. S.]
FRIEDRICH RUNKEL. [L. S.]

Witnesses:
OTTO KÖNIG,
WILLY KLEIN.